United States Patent [19]

Shiomi

[11] Patent Number: 5,619,030
[45] Date of Patent: Apr. 8, 1997

[54] CONTROL APPARATUS FOR IMAGE BLUR PREVENTION EMPLOYING AN ANGULAR VELOCITY AND AN IMAGE FIELD SENSOR

[75] Inventor: Yasuhiko Shiomi, Kawaguchi, Japan

[73] Assignee: Canon Kabushiki Kaisha, Tokyo, Japan

[21] Appl. No.: 647,262

[22] Filed: May 13, 1996

Related U.S. Application Data

[63] Continuation of Ser. No. 183,839, Jan. 21, 1994, abandoned.

[30] Foreign Application Priority Data

Jan. 22, 1993 [JP] Japan .................. 5-009338

[51] Int. Cl.$^6$ .................. G01J 1/20; G03B 13/00
[52] U.S. Cl. .................. 250/201.1; 348/208; 396/55
[58] Field of Search .................. 250/201.1; 354/400, 354/432, 202; 348/208

[56] References Cited

U.S. PATENT DOCUMENTS

| | | | |
|---|---|---|---|
| 5,175,580 | 12/1992 | Shiomi | 354/410 |
| 5,189,518 | 2/1993 | Nishida | 358/222 |
| 5,210,559 | 5/1993 | Ohki | 354/202 |
| 5,210,563 | 5/1993 | Hamada et al. | 354/400 |
| 5,229,603 | 7/1993 | Shiomi | 250/231.1 |
| 5,266,981 | 11/1993 | Hamada et al. | 354/400 |
| 5,282,044 | 1/1994 | Misawa et al. | 358/222 |

FOREIGN PATENT DOCUMENTS

| | | |
|---|---|---|
| 3056924 | 3/1991 | Japan . |
| 3-192227 | 8/1991 | Japan . |
| 4134316 | 5/1992 | Japan . |
| 4-163533 | 6/1992 | Japan . |
| 4-215623 | 8/1992 | Japan . |
| 4-277728 | 10/1992 | Japan . |

*Primary Examiner*—Stephone Allen
*Attorney, Agent, or Firm*—Fitzpatrick, Cella, Harper & Scinto

[57] ABSTRACT

A control apparatus for image blur prevention includes a ontroller, which uses an output from at least one of first and second image blur detection portions (e.g., a mechanical sensor and an electrical sensor) having different image blur detection frequency characteristics, in accordance with the frequency of an image blur, whereby the two detection portions compensate for each other, and image blur prevention can be more precisely performed for image blurs in a wider frequency range.

56 Claims, 9 Drawing Sheets

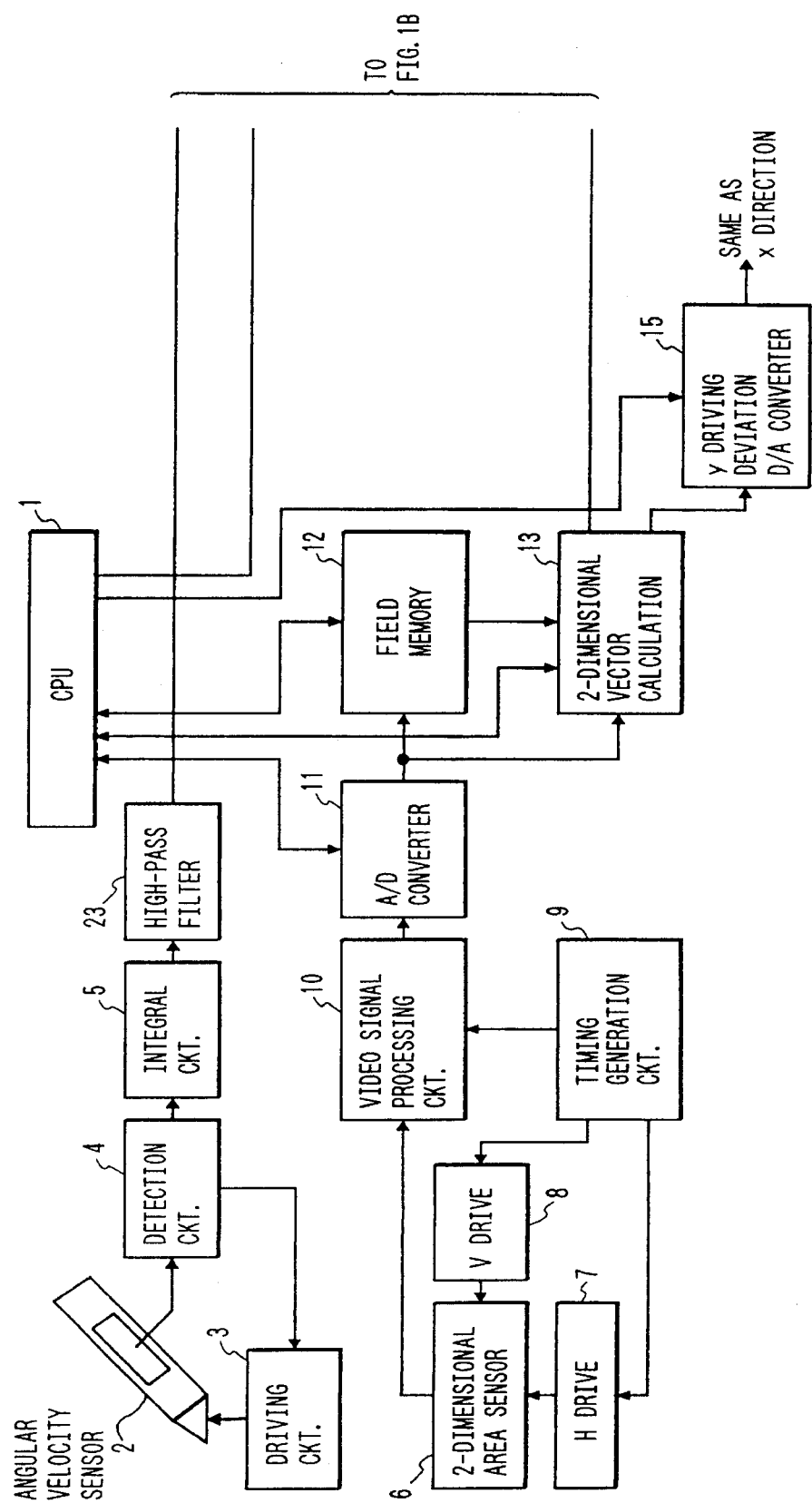

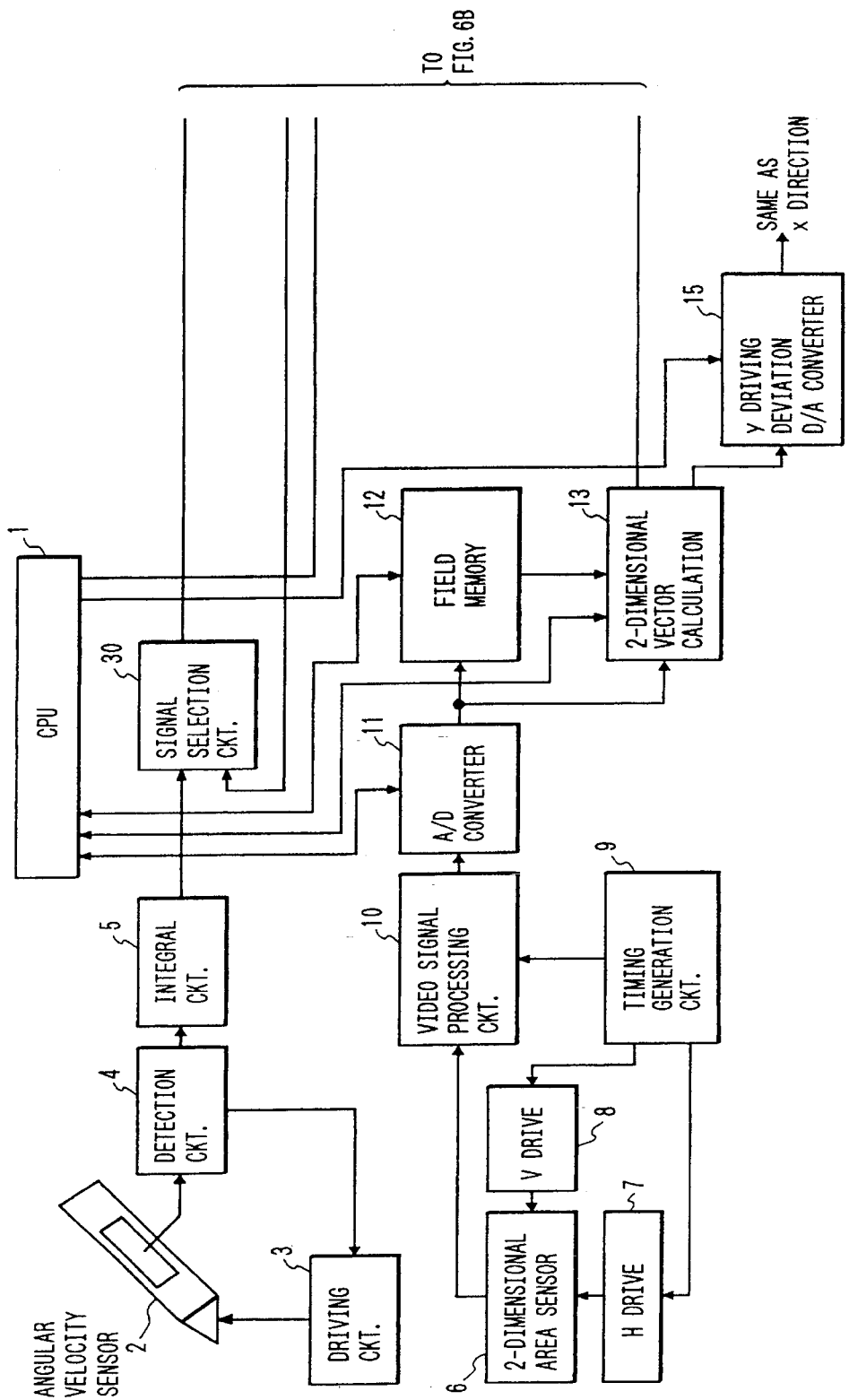

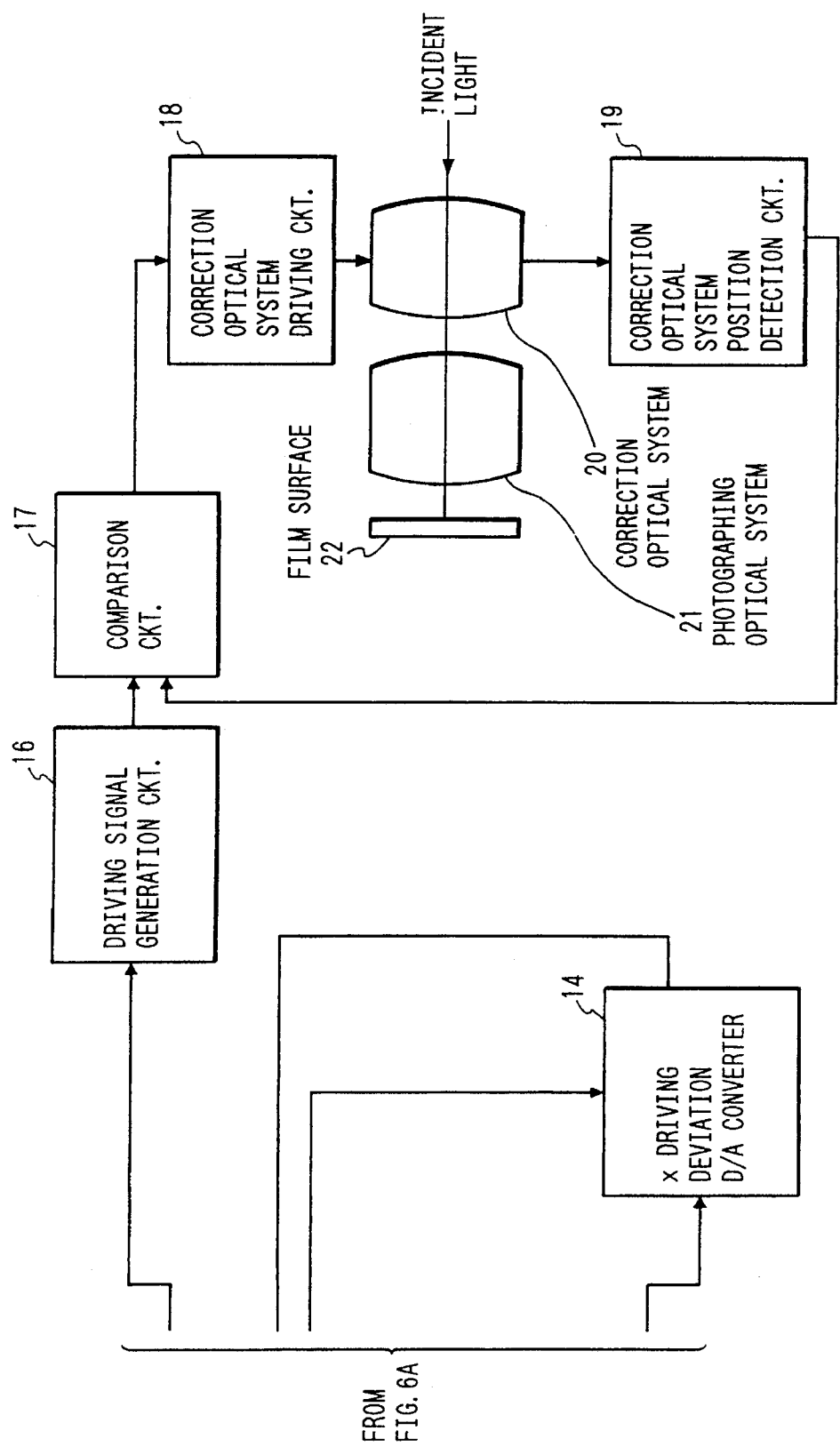

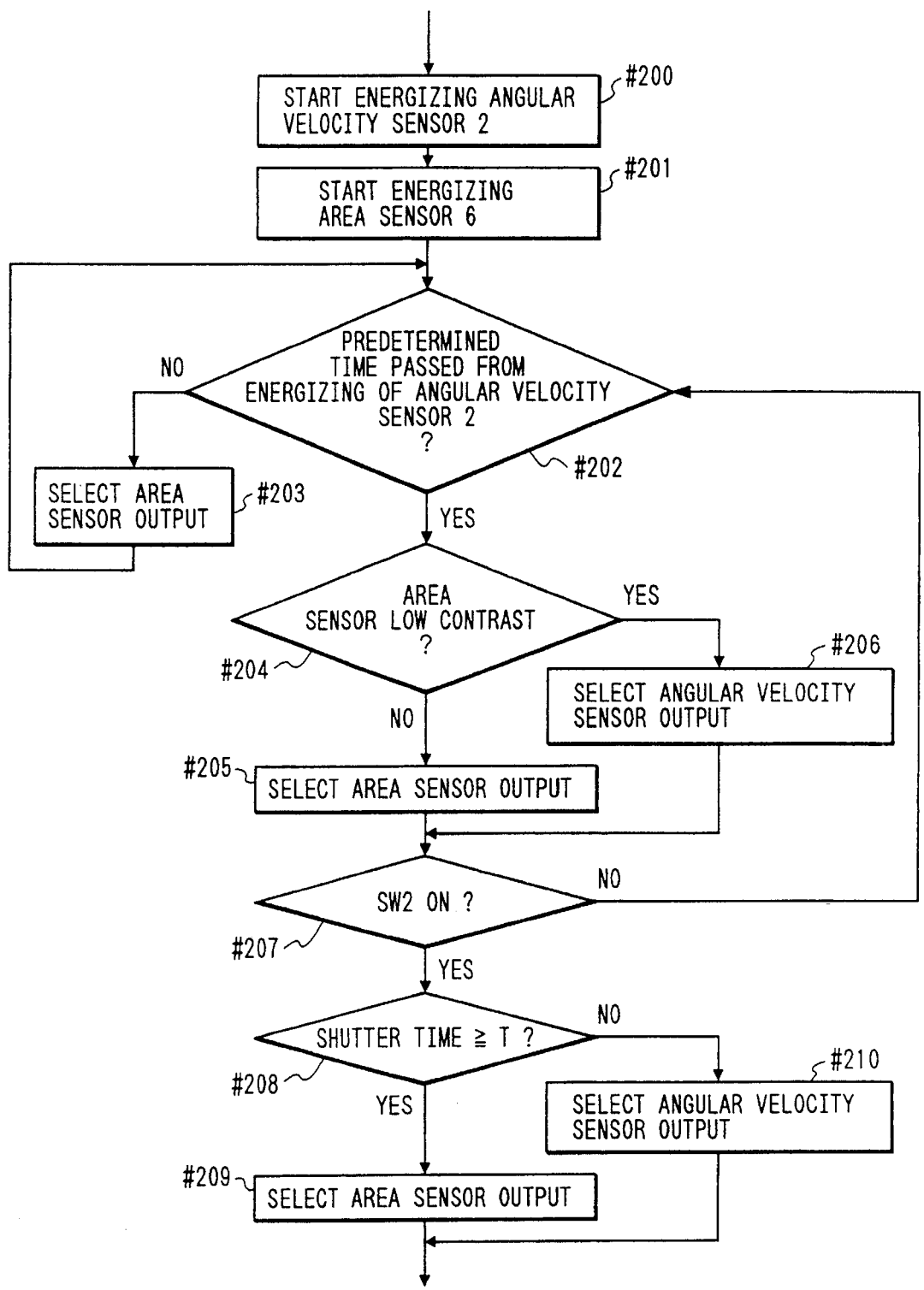

CONTROL APPARATUS FOR IMAGE BLUR PREVENTION EMPLOYING AN ANGULAR VELOCITY AND AN IMAGE FIELD SENSOR

This application is a continuation of application Ser. No. 08/183,839, filed Jan. 21, 1994, now abandoned.

BACKGROUND OF THE INVENTION

1. Field of the Invention

The present invention relates to control of an apparatus for preventing an image blur, which apparatus is used in cameras, optical devices, and the like.

2. Related Background Art

As a conventional image blur prevention apparatus of this type, an apparatus of a type for driving a correction optical system attached in or in front of a photographing lens on the basis of a vibration gyro type angular velocity sensor utilizing a Coriolis' force generated in a vibrating element in a camera-fluctuation detection sensor, or its output (in the case of the angular velocity sensor, an integral circuit for obtaining an angular deviation by integrating the detected angular velocity is normally added) is used. Also, an apparatus for extracting and outputting only a camera-fluctuation amount by a photographer by detecting, e.g., motion vectors of an object image using a 2-dimensional area sensor arranged in a camera main body, and driving the correction optical system on the basis of the output value is disclosed in Japanese Laid-Open Patent Application No. 3-192227.

However, in the conventional image blur prevention apparatuses, for example, in a system utilizing a mechanical sensor such as a vibration gyro, vibration detection performance at the low-frequency side inevitably deteriorates due to the nature of the sensor. For this reason, when a photograph is taken with a long shutter time, and a low-frequency vibration is generated, an image blur prevention effect is difficult to obtain (a photograph to be taken with a short shutter time is not easily influenced by a low-frequency vibration even when no image blur prevention function is in operation).

Although a system utilizing an optical sensor such as an area sensor has high vibration detection performance at the low-frequency side, the calculation speed for image processing of actual image data lags behind a photographing operation at the high-frequency side exceeding 10 Hz, and a fine vibration cannot be sufficiently corrected due to a specific ratio of the number of pixels of the area sensor to a correction range. With either one of these systems, it is difficult to obtain sufficient performance as an image blur prevention apparatus for a camera.

Also, an apparatus, which has both a mechanical sensor and an area sensor, and switches the outputs from the two sensors in correspondence with situations to perform an image blur prevention operation, has been proposed.

For example, Japanese Laid-Open Patent Application No. 4-215623 discloses a technique for selecting one of the outputs from the two sensors to be used in accordance with a shutter time. More specifically, an AF integral time and an actual exposure time are compared with each other, and when the AF integral time is longer than the exposure time, image blur prevention is performed in accordance with the output from the mechanical sensor; otherwise, image blur prevention is performed in accordance with the output from the area sensor.

Japanese Laid-Open Patent Application No. 4-277728 discloses a technique for (1) performing image blur prevention in accordance with the output from the mechanical sensor when an output cannot be obtained from the area sensor (e.g., when an object field is dark or when a mirror-up state is set in a TTL type system), and (2) performing image blur prevention in accordance with the output from the area sensor when the output from the mechanical sensor is small.

In the techniques disclosed in these two references, the sensors are not selectively used in accordance with the nature of a generated camera fluctuation, and each sensor must often detect a camera fluctuation, which is not easily detected by the selected sensor.

Furthermore, Japanese Laid-Open Patent Application No. 4-163533 discloses a technique for selecting the sensor to be used in accordance with the velocity of a generated camera fluctuation. More specifically, when the velocity of the generated camera fluctuation is smaller than a predetermined value, image blur prevention is performed in accordance with the output from the area sensor; otherwise, image blur prevention is performed in accordance with an angular velocity sensor as the mechanical sensor.

However, in the technique for selecting the sensor to be used in accordance with only the camera fluctuation velocity as in the technique disclosed in above-mentioned reference, when a camera fluctuation velocity is low but a high-frequency camera fluctuation is generated, the area sensor is selected. In this case, precise detection is disturbed due to a limitation on the accumulation time of the area sensor.

SUMMARY OF THE INVENTION

One aspect of the invention is to provide a control apparatus for image blur prevention, which has control means for using an output from at least one of first and second image blur detection portions having different image blur detection frequency characteristics in accordance with the frequency of an image blur, whereby image blur prevention can be more precisely performed for image blurs at various frequencies.

One aspect of the invention is to provide a control apparatus for image blur prevention, which has signal forming means for forming a signal for image blur prevention by combining outputs form first and second image blur detection portions having different image blur detection characteristics, whereby image blurs in a wider frequency range can be precisely detected, and image blur prevention can be performed more precisely.

Furthermore, one aspect of the invention is to provide a control apparatus for image blur prevention, which has control means for controlling a functional connection state between an output from a second image blur detection portion which substantially does not require a time until an output thereof is stabilized upon being started, and an image blur prevention portion for image blur prevention, in accordance with a state of a first image blur detection portion which requires a time until an output thereof is stabilized upon being started, thereby allowing image blur prevention even immediately after the detection portions are started.

BRIEF DESCRIPTION OF THE DRAWINGS

FIG. 6, which consists of FIGS. 6A and 6B, is a block diagram showing an arrangement according to the second embodiment of the present invention;

FIG. 7 is a flowchart showing an image blur prevention operation by the arrangement shown in FIG. 6.

DETAILED DESCRIPTION OF THE PREFERRED EMBODIMENTS (First Embodiment)

Figure 1B:
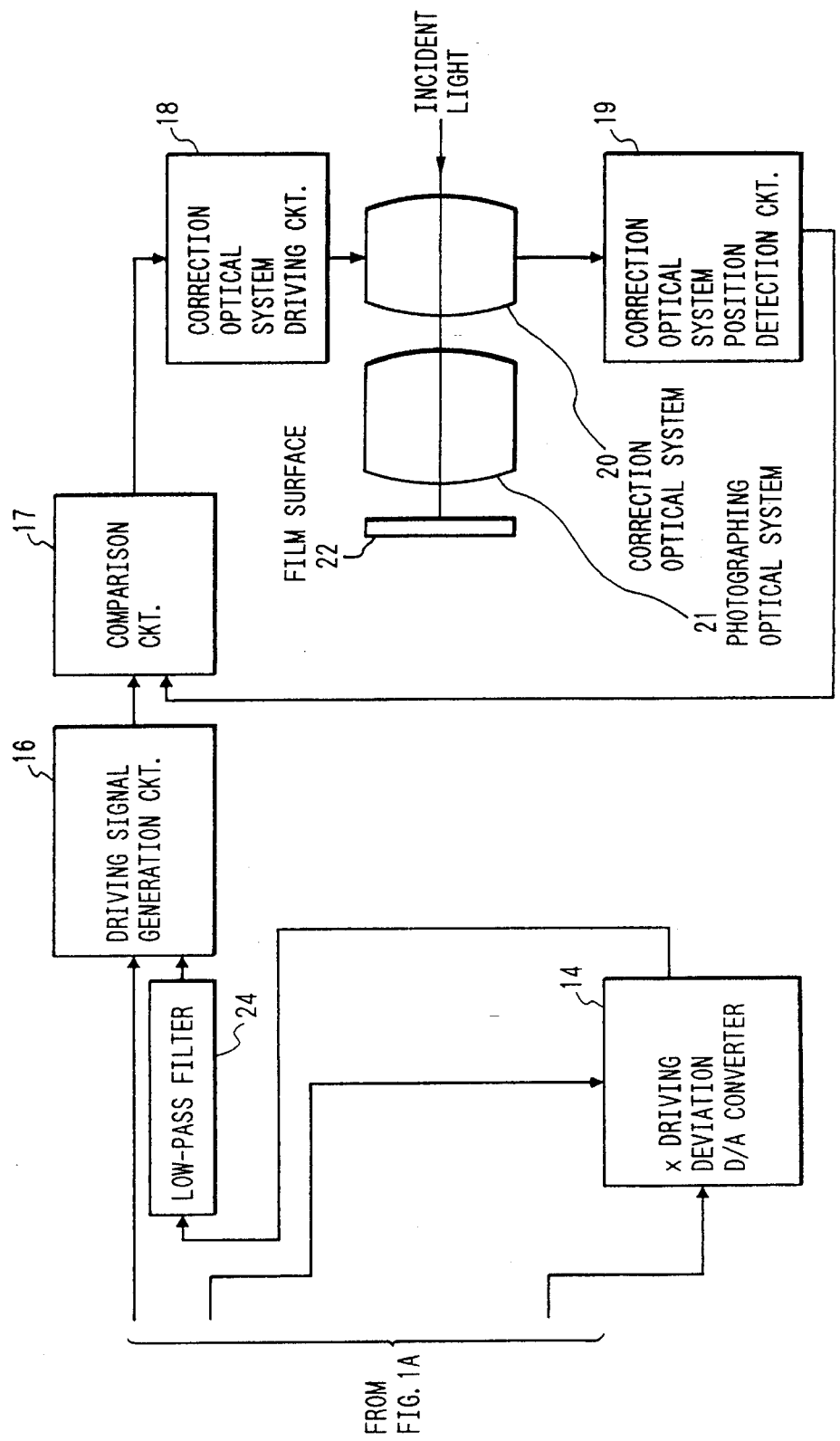
FIG. 1, which consists of FIGS. 1A and 1B, is a block diagram showing an arrangement according to the first embodiment of the present invention.

FIGS. 1A and 1B are block diagrams showing an arrangement of the first embodiment in which an image blur prevention apparatus of the present invention is applied to a camera. Referring to FIGS. 1A and 1B, a CPU 1 controls an image blur prevention operation. An angular velocity sensor 2 as a mechanical camera-fluctuation sensor detects a camera fluctuation in the x direction. A driving circuit 3 drives a vibrating element in the angular velocity sensor 2 on the basis of an output from a detection circuit 4 (to be described below). The detection circuit 4 converts an output from the angular velocity sensor 2 into a corresponding voltage level. An integral circuit 5 converts an angular velocity signal from the detection circuit 4 into an angular deviation signal by integrating the angular velocity signal. A high-pass filter 23 allows only a high-frequency component from the angular deviation signal from the integral circuit 5 to pass therethrough. Note that feedback control is executed among the angular velocity sensor 2, the driving circuit 3, and the detection circuit 4, so that a stable angular velocity can always be obtained from the output from the angular velocity sensor 2.

Although not shown, a sensor and a sensor output processing circuit for detecting a camera fluctuation in the y direction have the same arrangement as those for the x direction described above.

A 2-dimensional area sensor 6 as an optical camera-fluctuation sensor fetches and stores an image signal in accordance with a signal from an H drive circuit 7 and a signal from a V drive circuit 8 (to be described later), and outputs the stored image signal to a video signal processing circuit 10 (to be described later).

The H drive circuit 7 receives a synchronization signal for causing the 2-dimensional area sensor 6 to output an image signal associated with the yaw direction (x direction) (i.e., camera-fluctuation information in the yaw direction), converts the received signal into a driving signal, and outputs the driving signal to the 2-dimensional area sensor 6. The V drive circuit 8 has the same function as the H drive circuit 7 in the pitch direction (y direction).

A timing generation circuit 9 generates synchronization signals for causing the 2-dimensional area sensor 6 to output camera-fluctuation signals in the yaw and pitch directions, and outputs these signals to the H and V drive circuits 7 and 8.

The video signal processing circuit 10 receives image signals in the yaw and pitch directions output from the 2-dimensional area sensor 6, performs a predetermined correction calculation of, e.g., gains of the received signals, and serially outputs the corrected signals to an A/D converter 11 (to be described below) in units of pixels.

The A/D converter 11 converts the image signals output from the video signal processing circuit 10 into digital data in the order of pixel data, and sequentially transfers the conversion results to a field memory 12 (to be described below).

The field memory 12 receives the output signals from the A/D converter 11, and stores the pixel data from the 2-dimensional area sensor 6.

A 2-dimensional vector calculation circuit 13 calculates camera-fluctuation amounts in the yaw and pitch directions from the movement of an object image, and outputs camera-fluctuation signals corresponding to the calculated camera-fluctuation amounts in the yaw and pitch directions.

Yaw (x) and pitch (y) driving deviation D/A converters 14 and 15 respectively receive the camera-fluctuation signals in the corresponding directions from the 2-dimensional vector calculation circuit 13, and perform D/A conversion of the received signals.

A low-pass filter 24 allows only a low-frequency component of the output from the yaw driving deviation D/A converter to pass therethrough.

A driving signal generation circuit 16 receives the output signal (camera-fluctuation information in the yaw direction detected by the angular velocity sensor 2) from the high-pass filter 23 and the output signal (camera-fluctuation information in the yaw direction detected by the 2-dimensional area sensor 6) from the low-pass filter 24, and combines these signals to output a signal which reproduces the camera-fluctuation amount in the yaw direction.

A comparison circuit 17 receives the output signal from the driving signal generation circuit 16, and the output signal from a correction optical system position detection circuit 19 (to be described later), and amplifies and outputs the difference between the two signals.

A correction optical system driving circuit 18 drives a correction optical system 20 on the basis of the output signal from the comparison circuit 17.

The correction optical system position detection circuit 19 detects a positional deviation of the correction optical system 20, and outputs a signal corresponding to the detected deviation amount.

The correction optical system 20 is arranged in front of a photographing optical system 21, and deviates in the photographing optical path to deflect a photographing light beam. The photographing optical system 21 opposes a film surface 22.

Although not shown nor described, components for processing a camera-fluctuation signal in the pitch direction have the same arrangements as those of the above-mentioned components 16 to 19, 23, and 24.

Figure 2:
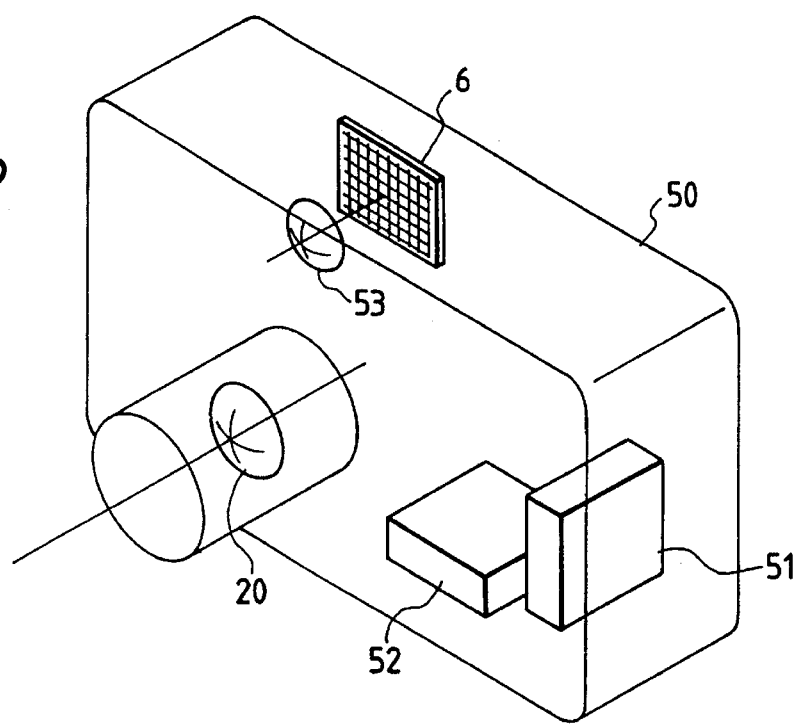
FIG. 2 is a perspective view of a camera according to the first embodiment of the present invention.

FIG. 2 is a perspective view of the camera according to the first embodiment of the present invention. As shown in FIG. 2, mechanical camera-fluctuation sensors 51 and 52 (corresponding to the angular velocity sensors in FIG. 1) respectively detect camera fluctuations in the yaw and pitch directions, and are arranged in the camera. The 2-dimensional area sensor 6 as the optical camera-fluctuation sensor is designed to fetch an object image corresponding to a photographing frame via an optical system 53, as shown in FIG. 2.

Figure 3A:
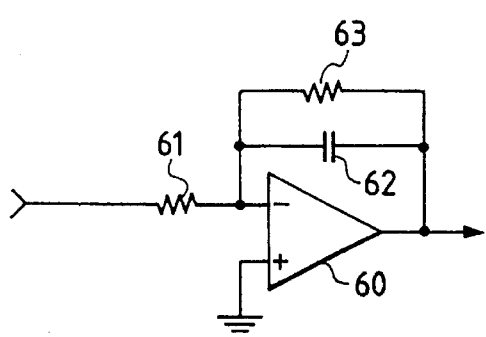
FIGS. 3A to 3C are circuit diagrams showing the arrangements of circuits shown in FIG. 1.
Figure 3B:
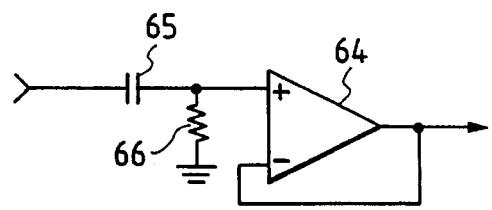
Figure 3C:
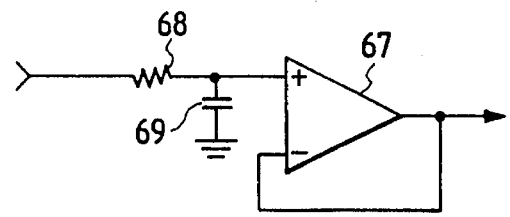

FIGS. 3A to 3C respectively show the arrangements of the integral circuit 5, the high-pass filter 23, and the low-pass filter 24. As shown in FIG. 3A, the integral circuit 5 comprises an operational amplifier 60, resistors 61 and 63, and a capacitor 62. As shown in FIG. 3B, the high-pass filter 23 comprises an operational amplifier 64, a capacitor 65, and a resistor 66. As shown in FIG. 3C, the low-pass filter 24 comprises an operational amplifier 67, a resistor 68, and a capacitor 69.

Figure 4:
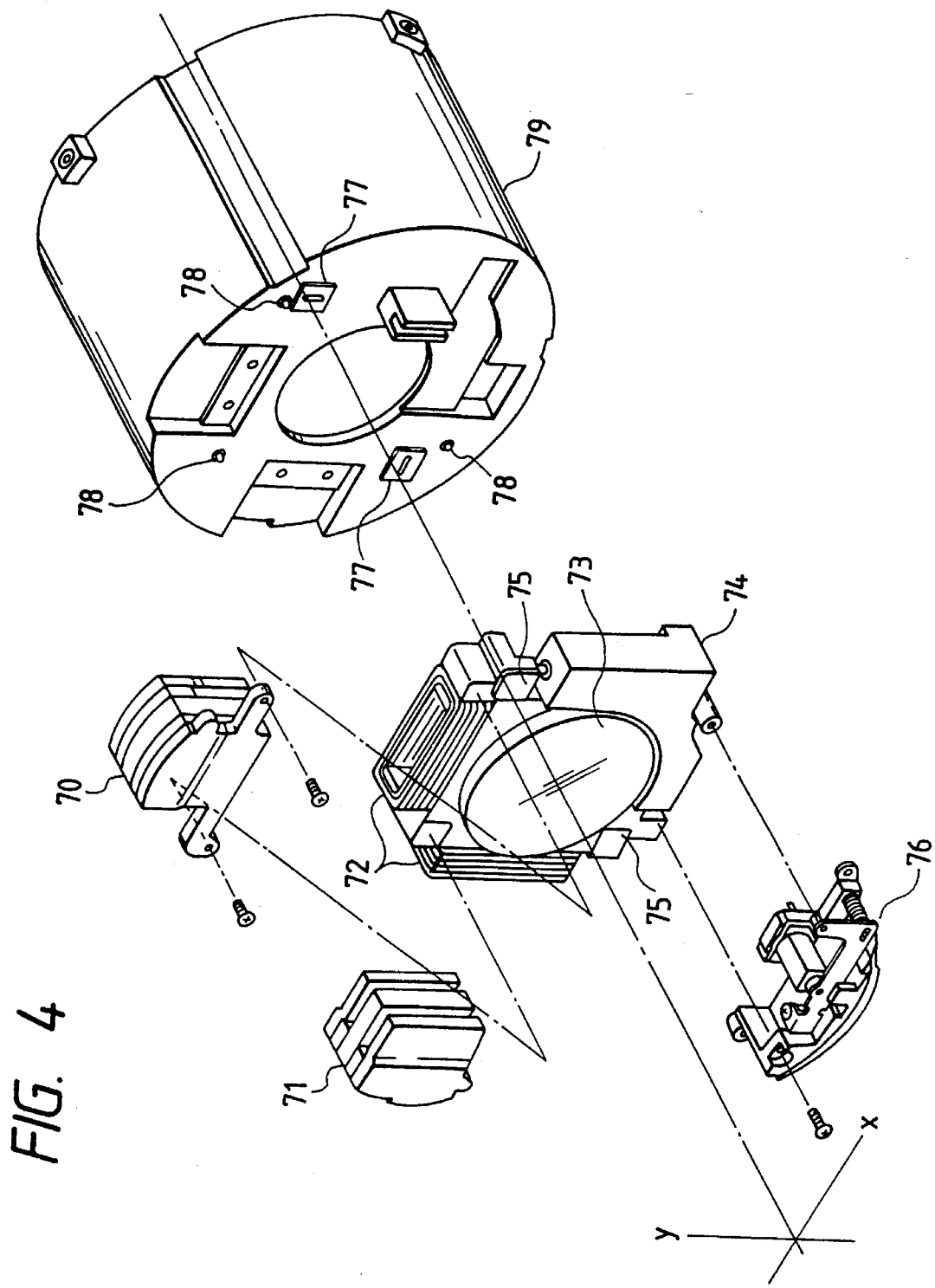
FIG. 4 is a perspective view showing an arrangement of a correction optical system according to the first embodiment of the present invention.

FIG. 4 shows the detailed arrangement of a shift optical system for translating a lens in the x and y directions perpendicular to the optical axis as the correction optical system 20. Yoke portions 70 and 71 serve as magnetic circuit units for respectively performing driving operations in the x- and y-axis directions, and coils 72 are arranged in correspondence with these yoke portions. Therefore, when a current is supplied to these coils, a lens 73 fixed by a support arm, a support frame 74, and the like is moved in the x and y directions. The movement of the lens shift system is optically detected by combinations of iREDs 75 which are moved together with the lens, and PSDs 77. Support balls 78 serve to prevent a tilt of the shift system. A mechanical lock mechanism 76 mechanically holds the lens at the center of the optical axis when energization to the shift system is stopped. A lens barrel portion 79 holds the entire lens shift system.

Figure 5:
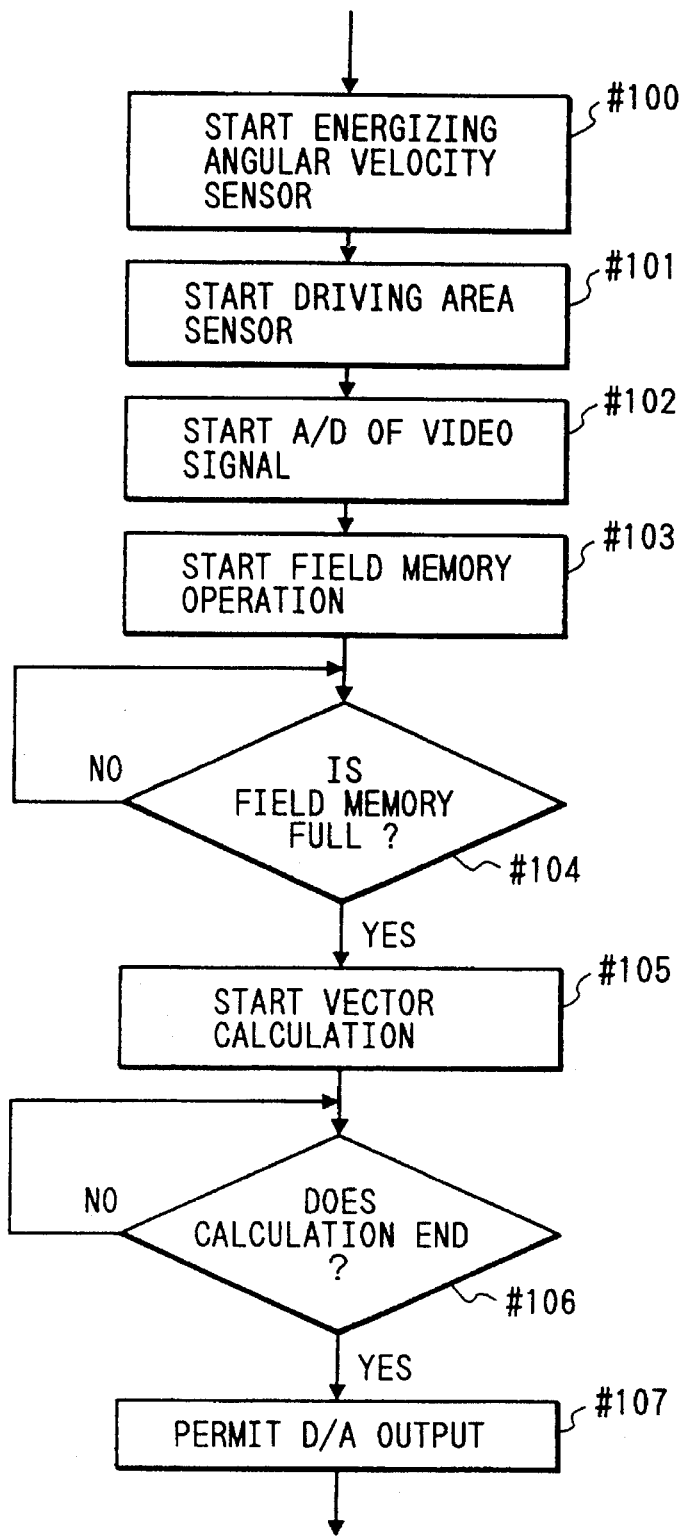
FIG. 5 is a flowchart showing an image blur prevention operation by the arrangement shown in FIG. 1.

FIG. 5 is a flowchart showing an image blur prevention operation of the camera according to the first embodiment of the present invention. The operations of the respective arrangements shown in FIGS. 1 to 4 will be described in detail below with reference to FIG. 5.

In step #100, energization to the angular velocity sensor 2 and its peripheral circuits is started in response to an instruction (not shown) from the CPU, and the output from the angular velocity sensor 2 is converted into a predetermined voltage level by the detection circuit 4. The output from the detection circuit 4 is input to the driving circuit 3, and the vibrating element in the angular velocity sensor is driven by the driving circuit. Thus, in this arrangement, feedback control is executed, and a stable angular velocity can always be obtained from the output from the angular velocity sensor 2. The angular velocity output from the detection circuit 4 is integrated by the integral circuit 5 to be converted into an angular deviation, and the output from the integral circuit 5 is input to the high-pass filter 23. The high-pass filter 23 extracts only a high-frequency component of the input signal. In step #101, when the driving operation of the area sensor is started, synchronization signals are generated by the timing signal generation circuit 9, and are respectively input to the H (horizontal) and V (vertical) drive circuits 7 and 8. The 2-dimensional area sensor 6 fetches and stores an image signal on the basis of the signals from the H and V drive circuits, and outputs the image signal to the video signal processing circuit. The video signal processing circuit performs a predetermined correction calculation of, e.g., gains of the input signal, and its output is serially supplied to the A/D converter 11 in units of pixels. In step #102, when A/D conversion of the video signal is started, the A/D converter 11 converts pixel data into digital data in turn, and sequentially transfers the digital data to the field memory 12. The field memory 12 stores the pixel data from the 2-dimensional area sensor 6, as described above. When all image data at different timings (first image data, and the next image data after an elapse of a predetermined period of time after the first image data are fetched), it is detected in step #104 that the field memory 12 is full of data, and a vector calculation start command is output in step #105. The 2-dimensional vector calculation circuit 13 calculates camera-fluctuation amounts in the yaw (x) and pitch (y) directions on the basis of the movement of an object image. In the vector calculation circuit 13, some detection areas are assigned, and whether an object itself is moving or it is being moved by a camera fluctuation of a photographer is determined based on the moving amounts from these areas. When the calculation ends, the end of the calculation is detected in step #106, and values corresponding to camera-fluctuation angles are output to the D/A converters 14 and 15. When the outputs of the D/A converters 14 and 15 are permitted in step #107, these outputs are input to the low-pass filter 24, and only a low-frequency component is extracted by the low-pass filter 24. In this manner, only a high-frequency component signal from a mechanical sensor such as a vibration gyro, and a low-frequency component signal from an optical sensor such as an area sensor are input to the driving signal generation circuit 16, and are combined by the circuit 16, thereby outputting a signal, which precisely reproduces the camera-fluctuation amount of a photographer in a wide range from the low to high frequencies. The output from the driving signal generation circuit 16 and the output from the correction optical system position detection circuit 19 for detecting the actual movement of the correction optical system are input to the comparison circuit 17, and the difference between the two signals is amplified by the circuit 17. The amplified difference is supplied to the correction optical system driving circuit 18, and is converted into a predetermined driving current by the circuit 18, thus actually driving the correction optical system 20. The correction optical system 20 is driven, as shown in FIGS. 1A and 1B. The correction optical system 20 is attached in front of the photographing optical system, as shown in FIGS. 1A and 1B, and incident light from an object reaches the film surface 22 via the correction optical system 20 and the photographing optical system 21. Therefore, this incident light is inclined in the directions of the x and y axes of a plane perpendicular thereto upon movement of the correction optical system 20 in the x and y directions, thus faithfully correcting an image blur in correspondence with the camera-fluctuation signals from the above-mentioned sensors.

(Second Embodiment)

FIGS. 6A and 6B are block diagrams showing the arrangement according to the second embodiment of the present invention. Since the components 1 to 22 are the same as those in FIGS. 1A and 1B, a detailed description thereof will be omitted. A signal selection circuit 30 added in the second embodiment selects one of the outputs from the above-mentioned mechanical camera-fluctuation detection sensor 2 and optical sensor 6 in correspondence with situations on the basis of an instruction from the CPU 1.

FIG. 7 is a flowchart showing an image blur prevention operation by the arrangement shown in FIGS. 6A and 6B. An instruction operation of the CPU 1 to the signal selection circuit 30 will be described below with reference to the flowchart in FIG. 7. In steps #200 and #201, energization to the angular velocity sensor 2 and the area sensor 6 is started. In step #202, it is checked if a predetermined time has passed from the start of energization of the angular velocity sensor 2. If N (NO) in step #202, the CPU issues an instruction for causing the signal selection circuit 30 to output the output from the area sensor 6 to the driving signal generation circuit 16 in step #203. This means that the correction optical system 20 is driven by a camera-fluctuation detection signal from the area sensor 6 during a rising stabilization time necessary for a mechanical sensor such as a vibration gyro.

If it is detected in step #202 that the predetermined time has passed, it is checked in step #204 if image data detected by the area sensor 6 has low contrast. If N in step #204, the flow advances to step #205 to directly supply the output from the area sensor 6 to the driving signal generation circuit 16. However, if Y (YES) in step #204, since a camera-fluctuation signal from the area sensor 6 has low reliability, the flow advances to step #206 and the output from the angular velocity sensor 2 is supplied to the driving signal generation circuit 16. Furthermore, it is checked in step #207 if a switch SW2 (not shown) of the camera for starting an actual shutter release operation is depressed. If N in step #207, the above-mentioned operations in steps #204 to #207 are repeated. However, if the switch SW2 is ON, and an actual release operation is started, it is checked in step #208 if a shutter time is longer than a predetermined time T. When the shutter time is longer than the predetermined time T, since high performance at the low-frequency side is required, the output from the area sensor 6 is selected in step #209. On the other hand, when the shutter time is shorter than the predetermined time T, the flow advances to step #210 to select the output from the angular velocity sensor, so that a fine camera-fluctuation can be corrected.

(Third Embodiment)

Figure 8:
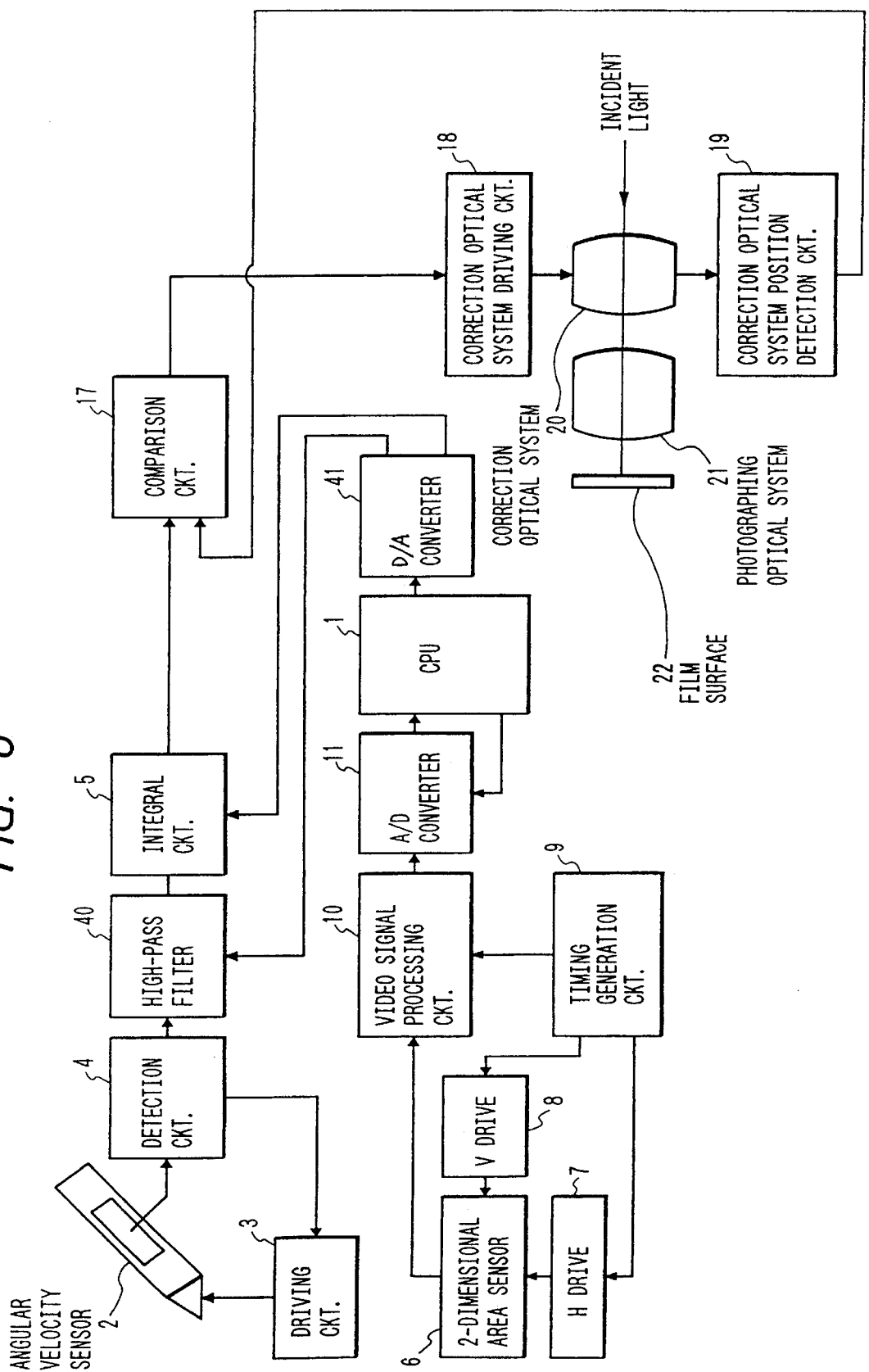
FIG. 8 is a block diagram showing an arrangement according to the third embodiment of the present invention.

FIG. 8 is a block diagram showing the arrangement according to the third embodiment of the present invention. Since the components 1 to 22 are the same as those in FIGS. 1A and 1B, a detailed description thereof will be omitted. The output from the angular velocity sensor 2 is output via the detection circuit 4. Normally, since the output from the sensor 2 includes a DC offset (a certain output is obtained even when the angular velocity=0), the output from the detection circuit 4 is input to a high-pass filter 40 so as to remove signal components below a predetermined frequency before it is input to the integral circuit 5. The high-pass filter 40 has an arrangement shown in FIG. 3B. Therefore, since the high-pass filter 40 and the integral circuit 5 have a frequency range widened to the low-frequency side, they have large time constants, and a very long time is required until the output from the angular velocity sensor is converted into a predetermined angular deviation. (More specifically, a long time is required until the capacitor 65 shown in FIG. 3B is charged.) Thus, in this embodiment, as described above, pixel data from the video signal processing circuit 10 are converted into digital values by the A/D converter 11, and the digital values are directly fetched by the CPU. The CPU roughly predicts a camera-fluctuation signal from the fetched data, and outputs an initial voltage to the high-pass filter 40 and the integral circuit 5 via a D/A converter 41 on the basis of the prediction result. Therefore, the capacitor used in the above-mentioned circuit is set with an initial voltage according to the camera-fluctuation operation even in a hand-holding operation, and the rising time of the sensor can be greatly shortened.

As described above, according to each of the embodiments of the present invention, since a mechanical sensor which normally has excellent high-frequency performance, and an optical sensor which has excellent low-frequency performance in principle are combined in correspondence with conditions, a proper image blur prevention operation can be realized under various conditions, which cannot be coped with by independent sensors, thus constituting an image blur prevention system with higher performance.

In each of the above embodiments, the present invention is applied to a silver chloride camera. However, the present invention may be similarly applied to other image pickup apparatuses and optical devices such as a video camera.

In each of the above embodiments, a vibration gyro (angular velocity sensor) is used as mechanical camera-fluctuation detection means. However, another angular velocity sensor, a velocity sensor, a deviation sensor, an angular deviation sensor, an acceleration sensor, an angular acceleration sensor, or the like may be used.

In each of the above embodiments, means having an optical member which moves in a plane substantially perpendicular to the optical axis is used as image blur correction means. However, another means for optically performing image blur correction, e.g., a variable apical angle prism, may be used. Furthermore, the present invention is not limited to optical image blur prevention means, and means for performing image blur correction by electrically correcting an image itself may be used.

What is claimed is:

1. A control apparatus for controlling image blur prevention using at least one of a first image blur detection signal from a first image blur detection device that detects at least image blur in a first frequency range and a second image blur detection signal from a second image blur detection device that detects at least image blur in a second frequency range, said control apparatus comprising:

a control device that controls image blur prevention using at least one of the first and second image blur detection signals, said control device changing a manner of use of the first and the second detection signals in accordance with a frequency of the image blur.

2. An apparatus according to claim 1, wherein said apparatus comprises the first image blur detection device.

3. An apparatus according to claim 1, wherein said apparatus comprises the second image blur detection device.

4. An apparatus according to claim 1, wherein said control means comprises means for utilizing an output of the first image blur detection portion for image blur prevention of image blur in a first frequency range, and for utilizing an output of the second image blur detection portion for image blur prevention of image blur in a second frequency range different from the first frequency range.

5. An apparatus according to claim 1, wherein said control means comprises means for combining an image blur signal in a first frequency range and an image blur signal in a second frequency range different from the first frequency range, and thereby, for forming an image blur signal, wherein the image blur signal in the first frequency range is outputted from the first image blur detection portion and the image blur signal in the second frequency range is outputted from the second image blur detection portion.

6. An apparatus according to claim 1, wherein said control device comprises means for using the output from the first image blur detection device in order to prevent image blur in the first frequency range, and for using the output from the second image blur detection device in order to prevent image blur in the second frequency range.

7. An apparatus according to claim 1, wherein the first image blur detection device comprises means for actually detecting an image blur in a first frequency range, and the second image blur detection device comprises means for actually detecting an image blur in a second frequency range different from the first frequency range.

8. An apparatus according to claim 7, wherein said control device comprises means for forming a signal for image blur prevention by combining the outputs from the first and the second image blur detection devices.

9. An apparatus according to claim 7, wherein the first frequency range is a range higher than a predetermined frequency, and the second frequency range is a range lower than the predetermined frequency.

10. An apparatus according to claim 1, wherein the first image blur detection device comprises means for detecting a fluctuation of the apparatus.

11. An apparatus according to claim 10, wherein the first image detection device comprises a mechanical sensor for detecting fluctuation of the apparatus.

12. An apparatus according to claim 1, wherein the second image blur detection device comprises means for detecting a movement of an image on a photoelectric conversion element.

13. An apparatus according to claim 12, wherein the second image blur detection device comprises an electrical sensor for detecting movement of the image on the photoelectric conversion element.

14. An apparatus according to claim 1, wherein said control device comprises means for driving an image blur prevention device for preventing image blur in accordance with an output from at least one of the first and the second image blur detection devices.

15. An apparatus according to claim 14, wherein the image blur prevention portion comprises means for preventing an image blur by deflecting a light beam upon movement in an optical path.

16. An image blur prevention apparatus for preventing image blur using at least one of a first image blur detection signal from a first image blur detection device that detects at least image blur in a first frequency range, and a second image blur detection signal from a second image blur detection device that detects at least image blur in a second frequency range, said image blur prevention apparatus comprising:

an image blur prevention device which performs image blur prevention using at least one of the first and the second detection signals, said image blur prevention device changing a manner of use of the first and the second detection signals in accordance with a frequency of the image blur.

17. An optical apparatus to which an image blur prevention device for preventing an image blur is adapted, wherein the image blur prevention device performs image blur prevention using at least one of a first image blur detection signal from a first image blur detection device that detects at least image blur in a first frequency range and a second image blur detection signal from a second image blur detection device that detects at least image blur in a second frequency range, the optical apparatus comprising:

an operation device which causes the image blur prevention device to perform an image blur prevention operation using at least one of the first and the second detection signals, said operation device changing a manner of use of the first and the second detection signals in accordance with a frequency of the image blur.

18. A camera to which an image blur prevention device for preventing image blur is adapted, wherein the image blur prevention device performs image blur prevention using at least one of a first image blur detection signal from a first image blur detection device that detects at least image blur in a first frequency range and a second image blur detection signal from a second image blur detection device that detects at least image blur in a second frequency range, the camera comprising:

an operation device which causes the image blur prevention device to perform an image blur prevention operation using at least one of the first and the second detection signals, said operation device changing a manner of use of the first and the second detection signals in accordance with a frequency of the image blur.

19. A control apparatus for processing a first image blur detection signal from a first image blur detection portion that detects image blur in a first frequency range and a second image blur detection signal from a second image blur detection portion that detects image blur in a second frequency range to control image blur prevention, said control apparatus comprising:

a first input terminal for inputting the first image blur detection signal;

a second input terminal for inputting the second image blur detection signal; and signal forming means for forming a control signal for image blur prevention by combining outputs from the first and second image blur detection portions having different image blur detection frequency characteristics, said signal forming means forming the control signal based on a difference between the frequency characteristics of the first and the second image blur detection signals.

20. An apparatus according to claim 19, wherein the first image blur detection portion comprises means for actually detecting an image blur in a first frequency range, and the second image blur detection portion comprises means for actually detecting an image blur in a second frequency range different from the first frequency range.

21. An apparatus according to claim 19, wherein the first image blur detection portion comprises a mechanical sensor for detecting the fluctuation of the apparatus.

22. An apparatus according to claim 19, wherein the second image blur detection portion comprises an electrical sensor for detecting the movement of the image on the photoelectric conversion element.

23. An apparatus according to claim 19, further comprising:

driving control means for driving an image blur prevention portion for preventing an image blur in accordance with the signal formed by said signal forming means.

24. An apparatus according to claim 23, wherein said apparatus comprises the image blur prevention portion.

25. An apparatus according to claim 19, wherein said apparatus comprises the first image blur detection portion.

26. An apparatus according to claim 19, wherein said apparatus comprises the second image blur detection portion.

27. An apparatus according to claim 19, wherein said apparatus is arranged in a camera.

28. An apparatus according to claim 19, wherein said apparatus is arranged in an optical device.

29. An apparatus according to claim 19, wherein said signal forming means comprises means for combining an image blur signal in a first frequency range and an image blur signal in a second frequency range different from the first frequency range, and thereby, for forming an image blur signal, wherein the image blur signal in the first frequency range is outputted from the first image blur signal and the image blur signal in the second frequency range is outputted from the second image blur detection portion.

30. An apparatus adapted to an image blur prevention device for performing image blur in accordance with at least one of an output from a first image blur detection device and an output from a second image blur detection device different from the first image blur detection device, said apparatus comprising:

an operation device for controlling a manner of response to the output of one of the first and the second image blur detection devices in accordance with the state of the other one of the first and the second image blur detecting devices.

31. An apparatus according to claim 30, wherein the first image blur detection device requires a lapse of time to attain a stable output state after a start operation, and the second image blur detection device does not require a substantial lapse of time to attain stable output after a start operation, and said operation device comprises means for changing a relationship of a connection between the second image blur detection device and the image blur prevention device in accordance with a state of the first image blur detection device.

32. An apparatus according to claim 31, wherein said operation device comprises means for causing the image blur prevention device to perform image blur prevention in accordance with the output from the second image blur detection device at least until the image blur prevention device achieves a stable state after a start operation.

33. An apparatus according to claim 32, wherein the operation device comprises means for causing the image blur prevention device to perform image blur prevention in accordance with the output from the second image blur detection device until at least a predetermined time has elapsed after at least the first image blur detection device is started.

34. An apparatus according to claim 30, wherein the first and the second image blur detection devices have different image blur detection characteristics.

35. An apparatus according to claim 30, wherein the first and the second image blur detection devices detect an image blur state in substantially the same direction.

36. An apparatus according to claim 30, wherein the first image blur detection device comprises a mechanical sensor for detecting fluctuation of the apparatus.

37. An apparatus according to claim 30, wherein the second image blur detection device comprises an electrical sensor for detecting movement of the image on a photoelectric conversion element.

38. An apparatus according to claim 30, wherein said apparatus comprises the first image blur detection device.

39. An apparatus according to claim 30, wherein said apparatus comprises the second image blur detection device.

40. An image blur prevention apparatus for performing image blur prevention in accordance with at least one of an output from a first image blur detection device and an output from a second image blur detection device different from the first image blur detection device, the apparatus comprising:

an image blur prevention device which prevents image blur in accordance with at least one of the output from the first image blur detection device and the output of the second image blur detection device; and an operation device for controlling a manner of response to the output from one of the first and the second image blur detection devices in accordance with a state of the other one of the first and the second image blur detection devices.

41. An optical apparatus to which an image blur prevention device is adapted, wherein the image blur prevention device performs image blur prevention in accordance with at least one of an output from a first image blur detection device and an output from a second image blur detection device different from the first image blur detection device, the apparatus comprising:

an operation device for controlling a manner of response to the output from one of the first and the second image blur detection device in accordance with a state of the other one of the first and the second image blur detection devices.

42. A camera to which an image blur prevention device is adapted, wherein the image blur prevention device performs image blur prevention in accordance with at least one of an output from a first image blur detection device and an output from a second image blur detection device different from the first image blur detection device, the camera comprising:

an operation device for controlling a manner of response to the output from one of the first and the second image blur detection devices in accordance with a state of the other one of the first and the second image blur detection devices.

43. A control apparatus for processing a first image blur detection signal from a first image blur detection portion that detects image blur in a first frequency range and a second image blur detection signal from a second image blur detection portion that detects image blur in a second frequency range to control image blur prevention, said control apparatus comprising:

a first input terminal for inputting the first image blur detection signal;

a second input terminal for inputting the second image blur detection signal; and control means for processing the first and second image blur detection signals to control image blur prevention, said control means comprising means for outputting a control signal using at least one of first and second image blur detection portions, in accordance with a frequency of an image blur.

44. An apparatus according to claim 43, wherein the first and second image blur detection portions have different detection characteristics from each other.

45. An apparatus according to claim 44, wherein the first and second image blur detection portions have different frequency detection characteristics from each other.

46. A control apparatus for processing a first image blur detection signal from a first image blur detection portion that detects image blur in a first frequency range and a second image blur detection signal from a second image blur detection portion that detects image blur in a second frequency range to control image blur prevention, said control apparatus comprising:

a first input terminal for inputting the first image blur detection signal;

a second input terminal for inputting the second image blur detection signal; and a control portion for processing the first and second image blur detection signals, in real time, to cause one image blur prevention portion to perform an image blur prevention operation in a predetermined direction in accordance with both signals.

47. An apparatus according to claim 46, wherein said apparatus comprises the first image blur detection portion.

48. An apparatus according to claim 46, wherein said apparatus comprises the second image blur detection portion.

49. An apparatus according to claim 46, wherein said apparatus is arranged in a camera.

50. An apparatus according to claim 46, wherein said apparatus is arranged in an optical device.

51. An apparatus according to claim 46, wherein the apparatus comprises the image blur prevention portion.

52. A control apparatus for processing a first image blur detection signal from a first image blur detection portion that detects image blur in a first frequency range and a second image blur detection signal from a second image blur detection portion that detects image blur in a second frequency range to control image blur prevention, said control apparatus comprising:

a first input terminal for inputting the first image blur detection signal;

a second input terminal for inputting the second image blur detection signal; and a control portion for processing the first and second image blur detection signals of the first and second image blur detection portions having different frequency characteristics from each other so as to be simultaneously utilized for image blur prevention.

53. An apparatus according to claim 52, wherein said apparatus comprises the first image blur detection portion.

54. An apparatus according to claim 52, wherein said apparatus comprises the second image blur detection portion.

55. An apparatus according to claim 52, wherein said apparatus is arranged in a camera.

56. An apparatus according to claim 52, wherein said apparatus is arranged in an optical device.

* * * * *

UNITED STATES PATENT AND TRADEMARK OFFICE
CERTIFICATE OF CORRECTION

PATENT NO. : 5,619,030
DATED : April 8, 1997
INVENTOR(S) : YASUHIKO SHIOMI

It is certified that error appears in the above-identified patent and that said Letters Patent is hereby corrected as shown below: On the title page,

AT [56] FOREIGN PATENT DOCUMENTS

"3056924" should read --3-56924--.
"4134316" should read --4-134316--.
On the title page,
AT [57] ABSTRACT "ontroller" should read --controller--.

Signed and Sealed this

Twenty-fifth Day of November, 1997

Attest:

BRUCE LEHMAN

Attesting Officer

Commissioner of Patents and Trademarks